Figure 5:
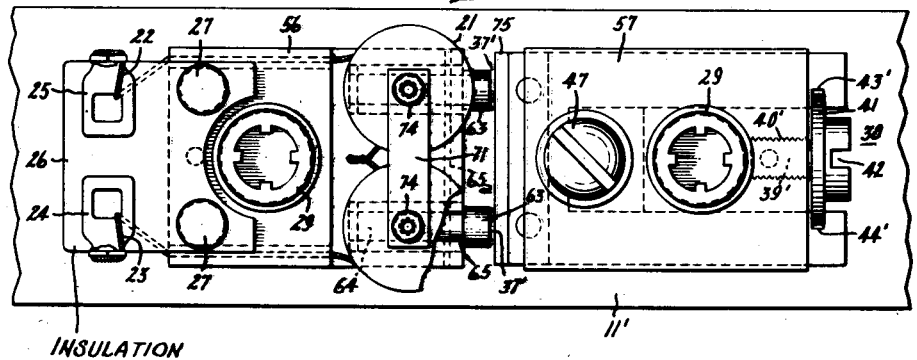

May 13, 1941.  S. J. MALMBERG  2,242,011
STRAIN GAUGE
Filed Feb. 1, 1940  2 Sheets-Sheet 1
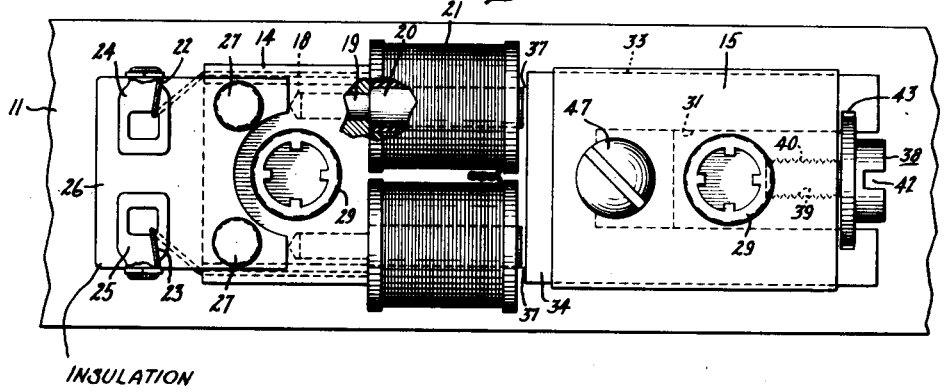
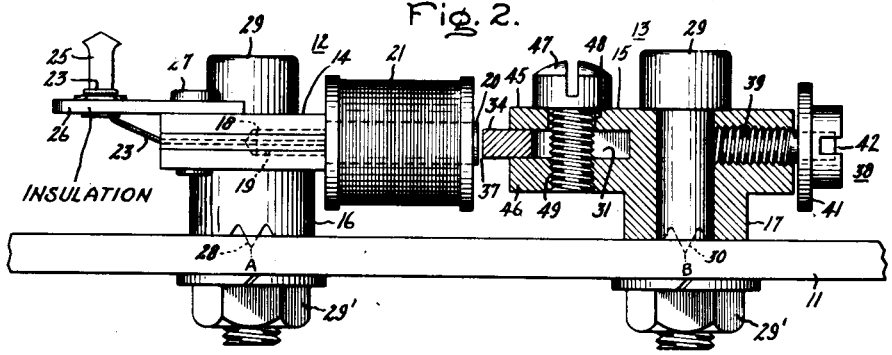
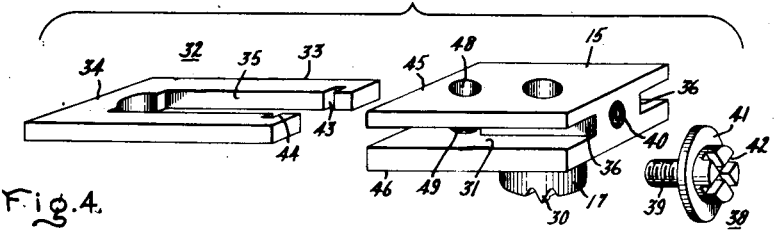
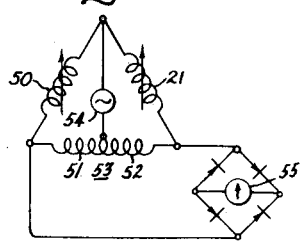
Inventor:
Sture J. Malmberg,
by Harry E. Dunham
His Attorney.

May 13, 1941.  S. J. MALMBERG  2,242,011
STRAIN GAUGE
Filed Feb. 1, 1940  2 Sheets-Sheet 2

Inventor:
Sture J. Malmberg,
by Harry E. Dunham
His Attorney.

Patented May 13, 1941

2,242,011

UNITED STATES PATENT OFFICE 2,242,011

STRAIN GAUGE

Sture J. Malmberg, Schenectady, N. Y., assignor to General Electric Company, a corporation of New York Application February 1, 1940, Serial No. 316,777

5 Claims. (Cl. 177—351)

This invention relates to improvements in strain gauges and more particularly to strain gauges of the electro-magnetic type in which the variation of an air gap in accordance with a deformation, change in dimension, or movement of a body or framework under load or stress conditions is utilized to vary the inductive reactance of a coil, these variations in reactance being converted by an electric measuring circuit into corresponding changes in an indicating or recording instrument.

It is an object of my invention to provide an improved electro-magnetic strain gauge which is of simple and compact construction, which is easy to mount in position and which may be easily and quickly adjusted for different conditions of operation.

It is another object of my invention to provide a strain gauge structure in which any tendency of rotation or shifting between the body and foot portions during attachment to the member under observation is obviated and in which rigidity during operation is insured.

It is a further object of my invention to provide a strain gauge construction which permits of ready duplication of parts whereby as the occasion arises the original gauge head may be replaced by another in exactly the same position.

It is also an object of my invention to provide an improved strain gauge construction in which straight line motion of the movable armature element during adjustment is insured with respect to the magnetic core or cores on which the gauge coil is positioned.

It is another object of my invention to provide a simple arrangement which permits ready adjustment of the armature to the desired position and which provides for positively locking the armature against movement with respect to its support.

It is an additional object of my invention to provide a strain gauge head of the foregoing construction with means for compensating for changes in dimension in the body under observation due to temperature variations.

In carrying out my invention in its preferred form I provide a gauge head including an inductance coil having a variable air gap in its magnetic circuit, with the coil so mounted that its air gap varies with the movement or deformation to be measured. The coil and one part of the core or magnetic circuit are mounted on a foot made integral with the members of the magnetic circuit or secured against turning relative thereto and which can be readily secured to one point on the member under observation. The other part of the core or armature is mounted on a body also having a foot united therewith, and this foot is secured to another point on the member under observation. The armature in one instance is of substantially U-shape and is adjustably and securely positioned in a channel of U-shape formed in the body in which it is mounted, thereby assuring straight line movement of the armature during adjustment with respect to the other part of the core or magnetic circuit. When a dimensional change takes place in the member under observation, the two parts of the magnetic circuit will move relative to each other thereby varying the air gap and causing a change in the inductance of the coil. This change in inductance produces electrical variations which influence an indicating or recording instrument.

In accordance with a modified arrangement, the body portions of the gauge which support the magnetic circuit members are composed of the same material as the framework or body under observation or of material having the same coefficient of expansion in order to compensate for changes in dimension due to variation in temperature.

My invention will be better understood from the following description when considered in connection with the accompanying drawings and the features which are believed to be novel and patentable are pointed out in the appended claims.

Fig. 1 represents a plan view of a strain gauge constructed in accordance with my invention and applied to the measurement of dimensional changes in a body under stress; Fig. 2 is a side elevation view, partly in section, of the arrangement of Fig. 1; Fig. 3 is an exploded perspective view of a portion of the gauge of Figs. 1 and 2 showing the arrangement of the movable armature element and its supporting frame or body member; Fig. 4 is an electrical wiring diagram illustrating means for transforming the dimensional changes into electrical variations for observation on an indicating or recording instrument; and Figs. 5, 6 and 7, corresponding to Figs. 1 to 3, inclusive, illustrate a modified form of apparatus for compensating the gauge for changes in dimension of the body or framework in which the strain is being measured due to variations in temperature.

Referring to Figs. 1, 2 and 3 of the drawings I have illustrated a strain gauge head constructed in accordance with my invention and arranged for measuring the strain or dimensional changes between points A and B of a body or structure 11 under stress or load conditions. The gauge head is composed of two relatively movable members 12 and 13 comprising body portions 14 and 15 and integral feet 16 and 17, respectively. The body portion 14 is composed of magnetic material and is provided with a pair of longitudinal bores or openings 18 within which are positioned in firm engagement the reduced diameter portions 19 of magnetic legs or arms 20. The body portion 14 and the legs 20 thus comprise one of the relatively movable portions of the magnetic circuit. Positioned about one or each of the legs 20 is a current conducting winding 21. In the illustrated embodiment two windings are employed and they are connected in series circuit relation to magnetize the body portion 14 and the legs 20 in the same direction. A pair of current conductors 22 and 23 leading from the coils 21 are positioned in longitudinal grooves or openings formed in the body portion or member 14 and they are connected to a pair of terminals 24 and 25, respectively, which are fixed to a nonmagnetic supporting member 26 rigidly tied to the body member 14 by a pair of clamping pins or rivets 27. The foot 16 or supporting portion 16 is provided with a sharp surface or knife-edge portion 28 which engages the body 11 at point A and which when in position secures the parts 11 and 16 against relative movement. A depression may be formed in the member 11 to receive the knife-edge 28 or in some instances, depending upon the material composing the member under observation, this may not be necessary. The supporting member 16 may be securely held to the member 11 by means of a threaded bolt 29 which passes through a bore or opening in the body portion 14, the foot portion 16, and the member 11. In some cases it may be preferred to employ a nut such as 29' on the bolt 29 while in other instances the bolt may engage threads formed in the member 11 for holding the parts in position.

The relatively movable member 13, as stated previously, comprises a body portion or frame 15 which is integrally united with a foot or supporting member 17 and which has a knife-edge 30 similar to that of the supporting member 16 positioned at point B of the member 11 under investigation. A bolt 29 passing through the body 15 and the foot 17 secures these parts in position on the member 11 in a manner similar to that already described. Referring particularly to Fig. 3, the member or frame 15 is provided with a cut-away portion 31 in the form of a groove or channel of substantially U-shape. I provide a substantially U-shaped magnetic armature 32, comprising legs or arm portions 33 joined by a web or base portion 34. The armature 32 is positioned in the groove or channel 31 in complementary relation with the body 15 and with the edges 35 in engagement with the surfaces 36 formed on each side of the body 15 by the channel 31. This arrangement insures straight line motion of the armature 32 relative to the magnetic legs or cores 20 of the other relatively movable portion of the magnetic circuit.

I provide a simple arrangement for quickly and accurately adjusting the position of the web or base 34 of the armature relative to the frame or body 15 to vary the spacing or air gap 37 formed with the legs 20 of the other portion of the magnetic circuit. In accordance with the illustrated embodiment, this comprises a micrometer adjusting screw 38 having a threaded portion 39 for engagement with a threaded opening 40 formed in the frame or body portion 15, and also having a flange 41 and a head having grooves 42 for an operating tool. In the operating position the flange 41 rests in a pair of notches or indentations 43, 44 formed in the legs 33 of the armature 32 so that by rotating the adjusting screw 38 in one direction or the other the armature may be properly and positively positioned to form the desired air gap or spacing 37 between the web 34 and the legs 20 of the magnetic circuit. A pair of branch portions 45 and 46 of the frame 15 formed by the channel 31 provides means for securely clamping the armature 32 in a fixed position relative to the frame 15 after it has been properly adjusted by the adjusting screw 38. In the arrangement shown, a screw threaded bolt 47 passes through an opening 48 in the branch member 45 and engages a threaded portion 49 formed in the surface of an opening in the member 46. With the web 34 and a part of each leg 33 interposed between the members 45 and 46, the screw or bolt 47 may be adjusted to clamp the armature firmly in a given position.

In the assembly of the armature 32 in complementary relation with the body 15, referring to Fig. 3, with the screw 47 removed, the armature is positioned in the groove or channel 31 and moved far enough to the right to permit the flange 41 to be seated in the notches 43 and 44. The adjusting screw is then turned slightly to engage the threaded portion 39 with the body 15. The screw 47 may then be inserted, if desired, to apply a light pressure on the armature pending the final adjustment with the parts in position on the member 11 under investigation.

In the construction of the members of the magnetic circuit including the body portion 14, the legs 20, and the armature 32, I prefer to employ a magnetic material having a relatively high permeability, an example of which is a nickel-iron alloy of the character described in United States Patent No. 1,586,884 to G. W. Elmen. These members may also partake of a laminated construction, if desired. The body 15 and the supporting member or foot 17 may be composed of the same material if desired as a matter of convenience, although it need not be a material having magnetic characteristics.

Assume that it is desired to measure the strain or deformation in the body 11, or more specifically the extension or compression existing in the body 11, between the points A and B due to a load or stress. The gauge head design constants, such as the number of turns composing the gauge coil, the dimensions of the magnetic material employed in the magnetic circuit and the like, will have been chosen in advance from a rough estimation of the elastic constants and stresses to be encountered. The gauge head comprising the relatively movable members 12 and 13 is mounted in position with the knife edges 28 and 30 secured at the points A and B as already described. Since the strain in the body 11 will be rendered manifest by a change in the reactance of the coil 21, any suitable electrical measuring means may be employed which will respond to this change. A convenient measuring system which may be employed is one in which the gauge coil 21 is associated in a Wheatstone bridge circuit such as shown, for example, in Fig. 4.

Referring to Fig. 4 the coils 21 form one of the arms of a bridge circuit and in an adjacent arm of the bridge there is preferably employed a similar coil 50 which serves merely as a "dummy" or balancing unit. The other arms of the bridge comprise sections 51 and 52 of a reactor or resistance element 53. The bridge is energized across one of its conjugate portions by a suitable source of alternating current 54 and a current responsive instrument 55 of the indicating or recording type is connected across the other conjugate portion of the bridge. In the arrangement illustrated the instrument 55 is of the direct current or copper-oxide voltmeter type but it may be an alternating current responsive type, if desired. By using the direct-current type a linear proportion is obtained between the current and the displacement of the movable element of the instrument, whereas with the alternating current type this displacement varies as the square of the current. The bridge may be balanced to provide a zero reading of the meter, before a load or stress or a change therein is imposed on the body 11, by adjusting the reactance of the coil 50 and also by adjusting the armature 32 by means of the micrometer screw 42. With the armature 32 in the desired position the screw 47 is adjusted to securely clamp the armature in place between the branch members 45 and 46. The instrument 55 responds to variations in the magnetic flux threading the coil 21 or to variations in the reactance thereof.

While the gauge head illustrated in Figs. 1 to 3 may be employed with highly satisfactory results for a great many applications, it becomes desirable at times to measure the strain in members which do not have the same coefficient of expansion as the body members 14 and 15. Consequently, if for example the temperature increases by an appreciable amount, elongation takes place in the body 11 between the points A and B causing the air gap 37 to vary, thereby introducing an error in the measurement since the air gap change is now no longer caused solely by the forces acting on the body 11. In many instances there may be a great variation in temperature from the time the gauge is attached to the member under test and adjusted with its balancing unit to the time when the measurement is made. In such circumstances it is obviously important that this change be compensated in the gauge as far as possible.

Figure 6:
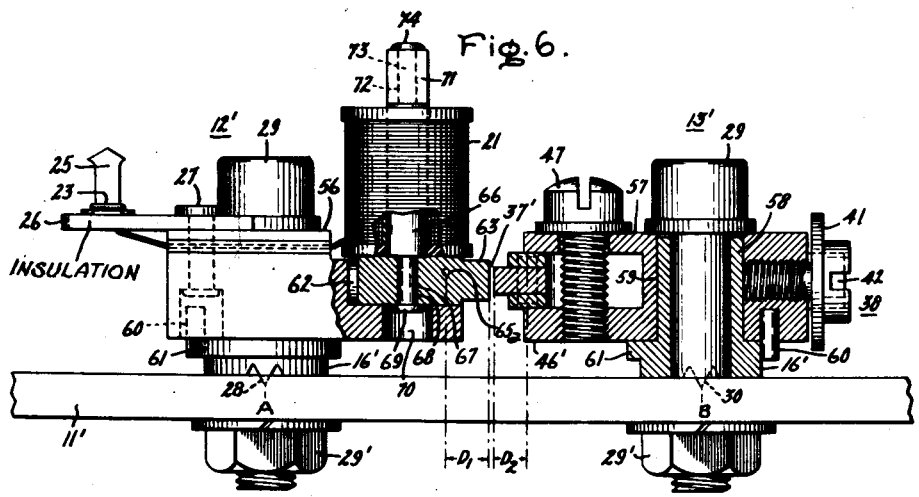
Figure 7:
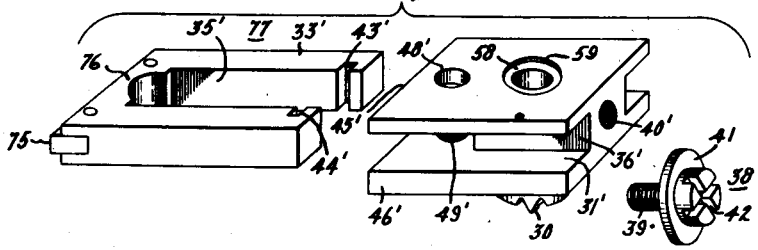

In Figs. 5 to 7 I have illustrated a modification embodying the principles of my invention in which the portions which support the members forming the magnetic circuit of the gauge are composed of the same material as the body or framework to be studied or of a material having the same coefficient of expansion to compensate for deformations or strains due to temperature variations. Corresponding parts are denoted by reference characters similar to those employed in the foregoing description of Figs. 1 to 3. In the illustrated embodiment, the gauge head is composed of two relatively movable body portions 56 and 57 which are composed either of the same material or of a material having the same temperature coefficient of expansion as the member or framework 11' in which the strain is to be observed. The feet or supporting members 16' are each formed from a cylindrical sleeve-like member having a relatively small diameter portion 58 extending into an opening or bore 59 formed in the bodies 56 and 57. A pin 60 passing through a flange 61 of the foot 16' locks one foot 16' to the body portion 56 and a similar pin locks the other foot 16' to the body portion 57 so that there can be no relative rotary movement between these parts.

The body portion 56 is provided with a plurality of longitudinal openings or bores 62 within each of which is positioned a cylindrical core or plug 63 of magnetic material. The longitudinal open portion 64 of the bores 62 being shorter across, as indicated at 65, than the diameter of the plugs 63, each of the latter is mildly forced into its respective bore and these core portions are held securely to to the gauge body by a pin 65a. The magnetic circuit mounted on the body portion 56 also includes a pair of magnetic cores or legs 66 about each of which is wound one of the series connected gauge coils 21. A reduced diameter end portion 67 of each core 66 passes through an opening 68 in the plugs or poles 63 and by peening the ends at 69 through an opening 70 formed in the lower portion of the body 56 the parts 66 and 63 are securely joined together. A magnetic member 71 having an opening 72 therein at each end is positioned over a second reduced diameter portion 73 of each of the cores 66 and by peening the ends of the cores at 74, the cores 66 are made to form a part of the same magnetic circuit. One of the relatively movable portions of the magnetic circuit thus includes the member 71, the pair of legs or cores 66, and the pair of plugs or poles 63.

In this instance the body member 57 is likewise provided with a channel or groove 31' similar to the groove 31 formed in the body member 15 of Figs. 1 to 3. However, a bar-shaped armature member 75 forming the other relatively movable magnetic member is employed in this case and this armature is secured to the web portion 76 of a U-shaped member 77 of much the same structural shape as the armature 32 of Fig. 3. The member 77 is composed of the same material as the body member 57.

It will thus be seen that as expansion, for example, takes place in the member 11' under observation this will tend to move the relative portions of the magnetic circuit farther apart to increase the air gap 37'. However, the body members 56 and 57 and the member 77 which supports the armature undergo a simultaneous expansion tending to decrease the gap 37'. Inasmuch as the material of which the parts 56, 57 and 77 are composed represents approximately 85 per cent of the total effective gauge length between the points A and B—the remaining portion of the gauge length, as represented by the dimensions D₁ and D₂, being accounted for by the magnetic material forming the magnetic circuit of the gauge coil 21 and the gauge 37'—it will be seen that this arrangement provides a highly satisfactory means of compensating for temperature variations.

The assembly of the apparatus, the method of adjustment of the various parts, the method of operation, and the advantages of the foregoing arrangement will be obvious from the description of these matters in connection with Figs. 1 to 4 so that a more detailed description is believed to be unnecessary. The arrangement of Figs. 5 to 7 is particularly suitable for use in observing the strains in various members of an airplane when under load or flight conditions, since the structural members of such machines are generally composed of alloys whose temperature coefficient of expansion is quite different from the material used in the magnetic circuit, and since the temperature conditions during flight conditions are likely to vary widely from the ground conditions or the conditions when the apparatus is installed in position and calibrated.

The system of the present invention may be employed to measure changes in dimension or the measuring instrument may be calibrated in terms of the force or load producing the strain, since the deformations of elastic bodies are proportional to the applied loads. Calibration may be accomplished by stressing the member under observation or a member of like characteristics a known amount, and observing the indications or response of the measuring instrument.

It will thus be seen that I have provided a strain gauge which is of simple and compact construction, which permits ready duplication of parts, which may be readily and accurately adjusted, and which maintains its adjusted position under operating conditions. By forming the body portion of the same material, or of a material having the same coefficient of expansion, as the framework in which the strain is to be measured, the effects of temperature variations may be eliminated.

While I have illustrated and particularly described certain embodiments of my invention for the purpose of explaining its principle and showing its application, it will be obvious to those skilled in the art that other modifications and variations are possible and I intend in the appended claims to cover all such modifications and variations which do not depart from the spirit and scope of my invention.

What I claim as new and desire to secure by Letters Patent of the United States is:

1. In a gauge for measuring the strain in a body under load or stress conditions, a pair of relatively movable members, one of said members comprising a body portion and a first foot or supporting member, said body portion and said foot being arranged in relatively fixed relation, means for securing said body portion and said foot to the body under observation, the other of said movable members comprising a frame and a second foot or supporting member arranged in relatively fixed relation, means for securing said frame and said second foot to the body under observation and in spaced relation to said body portion and said first foot, said body portion and said frame having portions extending toward each other, and said frame including a channel or groove having parallel portions in spaced relation, a magnetic circuit including relatively movable portions extending toward each other, one of said magnetic portions including magnetic cores secured to said body portion, the other of said magnetic portions including a magnetic armature member arranged to cooperate with said magnetic cores and forming an air gap therewith adapted to be varied in accordance with the strain in the body under observation, said armature member having portions arranged in said channel, and a current conducting winding associated with and adapted to produce magnetic flux in said magnetic circuit.

2. In a device for measuring the strain in a body under load or stress conditions, a pair of relatively movable members, one of said members comprising a body portion and a supporting member therefor, said body portion and said supporting member being secured against relative rotation, said body portion being composed of magnetic material and having magnetic members secured thereto, means for attaching said body portion and said supporting member in fixed relation with the body under observation, said other movable member comprising a frame having a channel formed therein of substantially U-shape, a supporting member for said frame, said supporting member being secured against rotation relative to said frame, means for attaching said frame and said frame supporting member in fixed relation to the body under observation and in spaced relation to said first body and supporting member, a magnetic armature having a web portion and a pair of legs secured thereto, said armature being positioned in the channel formed in said frame and in spaced relation to the magnetic members on said first body, means for adjusting said armature in said channel to vary the air gap formed with said magnetic members, means for locking said armature in position, and a current conducting winding associated in inductive relation with said magnetic members and adapted to be energized from a source of alternating current.

3. In apparatus for measuring the strain in a body subject to load or stress conditions, a first body member and a first supporting member, said supporting member being mounted with said body member and secured against rotation relative thereto, means for attaching said body member and said supporting member to the body to be tested, a second body member and a second supporting member, said second supporting member being mounted with said second body portion and secured against rotation relative thereto, means for mounting said second body member and said second supporting member in fixed relation with the body to be tested and in spaced relation to said first body member and supporting member, said second body member having a substantially U-shaped groove formed therein, a magnetic circuit comprising two relatively movable portions, one of said portions being secured to said first body portion and having a current conducting coil associated therewith, said other portion comprising a bar-shaped magnetic member secured to a substantially U-shaped supporting member, said supporting member being adapted to be positioned in the groove formed in said second body member, means for moving said supporting member in said groove to adjustably position said armature in spaced relation with the other portion of said magnetic circuit, and means for clamping said U-shaped supporting member in said groove.

4. In apparatus for measuring the strain in a body subject to load or stress conditions, a pair of relatively movable members, one of said members comprising a first body member and a first supporting member, said supporting member being assembled with said body member and secured against rotation relative thereto, the other of said relatively movable members comprising a second body member having a channel formed therein and a second supporting member, said second supporting member being assembled with said second body member and secured against rotation relative thereto, said first and second body portions being composed of a material having the same temperature coefficient of expansion as the body under observation, means for mounting said relatively movable members in fixed relation to the body under observation and in spaced relation to each other with said first and second body portions extending toward each other, a magnetic circuit comprising two relatively movable portions, one of said portions being secured to said first body portion and having an alternating current winding associated therewith, the other portion of said magnetic circuit comprising a magnetic armature, said magnetic armature having supporting means arranged in the channel of said second body member, and means for adjusting the position of said supporting means to vary the spacing between the relatively movable portions of said magnetic circuit.

5. In a device for measuring the strain in a body under load or stress conditions, a pair of relatively movable members, one of said members comprising a body portion and a supporting member therefor, said body portion and said supporting member being secured against relative rotation, said body portion being composed of magnetic material and having magnetic members secured thereto, means for attaching said body portion and said supporting member in fixed relation with the body under observation, said other movable member comprising a frame having a channel formed therein of substantially U-shape, a supporting member for said frame, said supporting member being secured against rotation relative to said frame, means for attaching said frame and said frame supporting member in fixed relation to the body under observation and in spaced relation to said first body and supporting member, a magnetic armature, said armature being positioned in said channel and in spaced relation to the magnetic members on said first body, an adjusting screw having a peripheral flange, notches in said armature adapted to cooperate with said flange so that upon movement of said adjusting screw said armature will be moved to vary the air gap formed between said magnetic members, and means for locking said armature in position.

STURE J. MALMBERG.